July 3, 1951 A. V. HAEFF 2,558,748
RADIO-FREQUENCY FILTER
Filed Dec. 14, 1945

Inventor
ANDREW V. HAEFF
By Murray C. Hayes
Attorney

Patented July 3, 1951

2,558,748

UNITED STATES PATENT OFFICE 2,558,748

RADIO-FREQUENCY FILTER

Andrew V. Haeff, Washington, D. C.

Application December 14, 1945, Serial No. 635,121

3 Claims. (Cl. 178—44)

(Granted under the act of March 3, 1883, as amended April 30, 1928; 370 O. G. 757)

This invention relates to radio frequency filters and in particular to method and means for producing the same.

In many applications in which radio frequency energy, particularly energy in the microwave frequencies, is generated or utilized, it is necessary that the circuit components involved with radio frequency energy be shielded. This shielding is both to conserve the radio frequency energy for its intended purposes and to prevent its radiation as a possible source of interference.

In such apparatus it is also necessary that connections to other circuit components such as power supplies, which connections must pass through this shielding, must utilize decoupling filters to keep the radio frequency energy out of such other circuit components. In the arrangement of such connections and decoupling filters, it is desirable that several conditions be met. Leads must be passed through the shielding in such a way that there is a minimum radiation leakage. The filters must be positioned in such a way that leads from the filters are not exposed to radio frequency energy within the shielding. The filters must be designed with regard to the space limitations within the shielding. Finally, the effectiveness of the filters must be maintained with due regard to the other three conditions.

An object of this invention is to provide a radio frequency filter which occupies a relatively small amount of space.

Another object of this invention is to provide a radio frequency filter with reduced capacitance between successive elements.

A further object of this invention is to provide a method for bringing leads through radio frequency shielding with a minimum leakage.

Other objects and features of the present invention will become apparent upon a careful consideration of the following detailed description when taken together with the accompanying drawings, in which.

Figure 3:
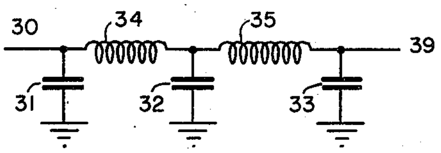
Fig. 3 is a schematic diagram of the equivalent circuit of this invention.

In accordance with Fig. 3 a conventional radio frequency filter comprises one or more units serially connected, each unit containing a low impedance path across the input and/or output and a high impedance path between input and output. In the equivalent circuit diagram the low impedance paths are represented by capacitors 31, 32 and 33, and the high impedance paths by choke coils 34 and 35. Employment of conventional circuit elements to construct a filter of this type for use with microwave frequencies, frequently involves difficulties with the capacity inherent in the choke coils, the spatial arrangement of the elements so as to preclude or minimize coupling with other elements, and with the lack of space available within the shielding. Moreover, no direct contribution is made to the problem of penetrating the shielding at the output 39 without leakage radiation.

In the present invention, each radio frequency filter is enclosed in a flat rectangular metal sheath. A plurality of these metal sheaths may be assembled together, according to the number of connections which must be made between terminals within and outside of the shielding of the radio frequency unit. This plurality of sheaths is made to penetrate the shielding so that the open ends of the sheaths are on either side of the shielding. Contact between the sheaths and the shielding is continuous so that radiation leakage is eliminated.

The novel design of the filters to make possible their being contained in compact metal sheaths and to make possible other advantages to be recited hereinafter is presently to be described in detail.

Figure 1:
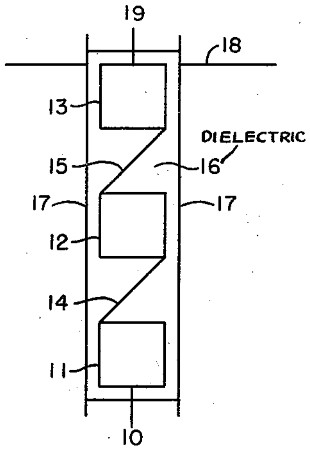
Fig. 1 is a plan view of the preferred embodiment of this invention.
Figure 2:
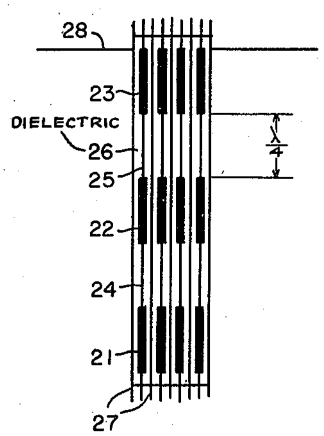
Fig. 2 is a longitudinal section view of the preferred embodiment of this invention in which four identical filters are assembled together.

The capacitors corresponding to capacitors 31, 32, and 33 of Fig. 3 are made up of metallic plates 11, 12, and 13 in Fig. 1 (elements 21, 22, and 23 in Fig. 2), the rectangular metal sheath 17 in Fig. 1 (elements 27 in Fig. 2) and a dielectric member 16 in Fig. 1 (element 26 in Fig. 2).

The inductances corresponding to choke coils 34 and 35 of Fig. 3 are indicated by connectors 14 and 15 in Fig. 1 and the connectors 24 and 25 in Fig. 2. These connectors each comprise wire of small diameter insulated from their respective sheath 17 or 27 by the dielectric material 16 or 26 respectively. Accordingly, they act as transmission lines with a characteristic impedance determined by their diameter, the particular dielectric material employed, and their spatial relation to the surrounding sheath; and they have an input impedance determined by their termination and their electrical length. The electrical length is made to equal or to approximate a quarter wave length at the radio frequencies which are to be blocked, and the terminations are capacitors which are effectively short circuits at these frequencies; consequently, connectors 14 and 15 in Fig. 1 and connectors 24 and 25 in Fig. 2, offer a very high impedance to these frequencies. According to methods analogous to those used in the design of conventional filters, the electrical lengths of the two lines can be made to differ, thus broadening the band of frequencies which is blocked.

In accordance with the present invention, the sheaths are utilized as the grounded plates of the capacitors as well as a means of shielding each filter independently from whatever field exists within the main shielding.

The shape of the sheaths which are used in the practice of the invention makes it possible to assemble a plurality of filters into a compact unit. In addition, the unit itself can be used as the channel for the leads through the main shielding member 18 in the Fig. 1 arrangement, or the shield 28 in Fig. 2, which channel will involve no radiation leakage.

Since the ungrounded capacitor plates are, for each filter, located in the same plane and separated by the space required for the high impedance lines, the capacitance between successive capacitors is very small.

The invention described herein may be manufactured and used by or for the Government of the United States of America for governmental purposes without the payment of any royalties thereon or therefor.

What is claimed is:

1. A radio frequency filter, comprising a plurality of flat capacitor plates spatially disposed in co-planar relation, a continuous conducting sheath insulatingly surrounding said plates and cooperating therewith to form the other plate of individual capacitor elements, individual elongated conductor elements of select lengths connecting said capacitor plates in tandem and cooperating with said sheath to form individual quarter-wave transmission line sections, each transmission line being effectively connected in series and each terminated in the low capacitated impedance of the individual capacitor elements.

2. A radio frequency filter, comprising a plurality of flat capacitor plates, spatially disposed in co-planar relation, a rectangular conducting tube insulatingly surrounding said plates and cooperating therewith to form the other plate of individual capacitor elements, individual elongated conductor elements of select lengths connecting said capacitor plates in tandem and cooperating with said rectangular tube to form individual quarter-wave transmission line sections, each transmission line being effectively connected in series and each terminated in the low radio frequency capacitative impedance of the individual capacitor elements.

3. In radio frequency apparatus having a shielding partition into which electrical connections are to be brought without the loss of radiation therefrom, a radio frequency filter, comprising a plurality of flat capacitor plates spatially disposed in co-planar relation, a continuous conducting sheath insulatingly surrounding said plates and cooperating therewith to form the other plate of individual capacitor elements, said outer sheath disposed in continuous contact with said shielding partition, individual elongated conductor elements of select lengths connecting said capacitor plates in tandem and cooperating with said sheath to form individual quarter-wave transmission line sections, each transmission line effectively connected in series and each terminated in the low capacitative impedance of said capacitor elements.

ANDREW V. HAEFF.

REFERENCES CITED

The following references are of record in the file of this patent:

UNITED STATES PATENTS

| Number | Name | Date |
|---|---|---|
| 2,143,369 | Dubilier | Jan. 10, 1939 |
| 2,178,299 | Dallenbach | Oct. 31, 1939 |
| 2,221,105 | Otto | Nov. 12, 1940 |
| 2,296,678 | Linder | Sept. 22, 1942 |
| 2,411,555 | Rogers | Nov. 26, 1946 |
| 2,438,913 | Hansen | Apr. 26. 1948 |

FOREIGN PATENTS

| Number | Country | Date |
|---|---|---|
| 541,380 | Great Britain | Nov. 25, 1941 |